Patented June 14, 1949

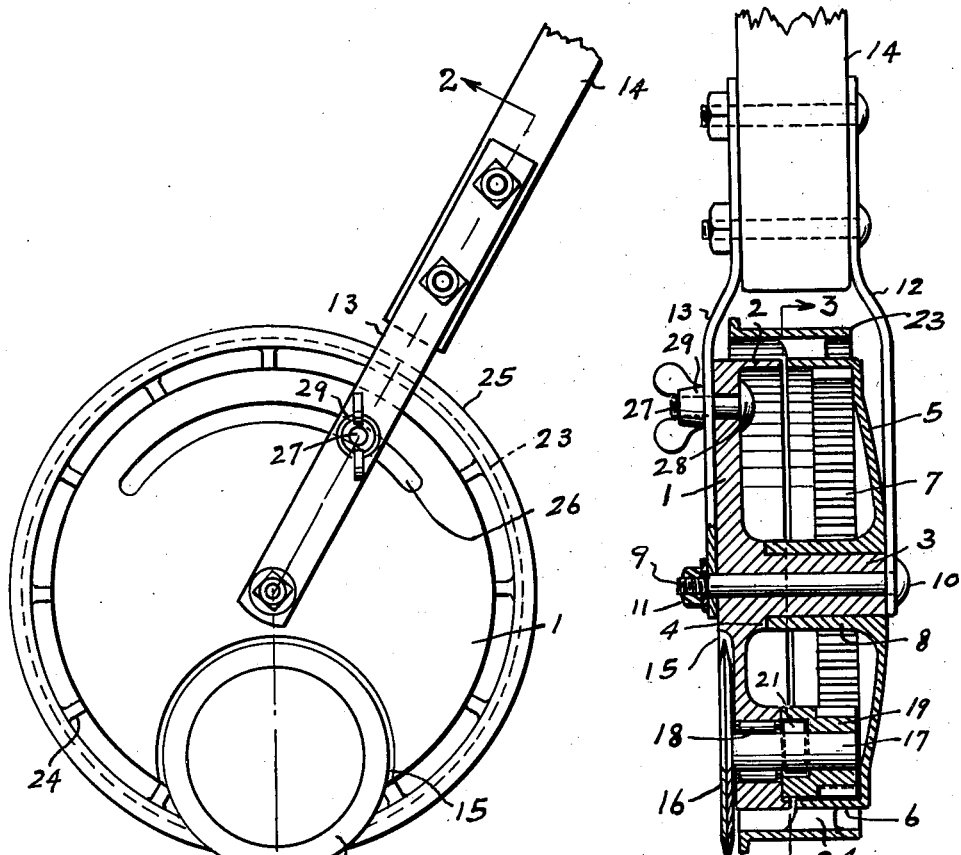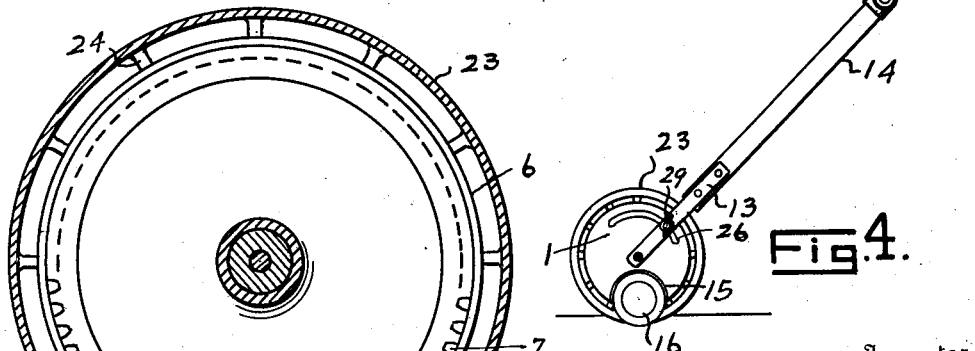

2,472,972

UNITED STATES PATENT OFFICE 2,472,972

LAWN EDGER

Hilton W. Hearn, Houston, Tex.

Application September 10, 1945, Serial No. 615,333

1 Claim. (Cl. 30—276)

This invention relates to a lawn edger.

An object of the invention is to provide an implement of the character described having a rotatable cutting disc and an associated ground wheel with operative connections between the ground wheel and disc whereby the latter will be driven from the former as the edger is moved forwardly.

The implement also embodies a driving connection including a clutch for clutching the cutting disc with the ground wheel as the implement is moved forwardly and for declutching the cutting disc from the ground wheel when the implement is moved rearwardly.

It is another object of the inevntion to provide an implement of the character described wherein the cutting disc is mounted on a frame which is adjustable about its axis relative to the ground wheel and relative to the handle by which the implement is propelled so as to vary the elevation of the cutting disc.

It is a further object of the invention to provide a lawn edger of the character described wherein the driving connections between the ground wheel and the cutting disc are completely enclosed.

Other objects and advantages will be evident from the following specification which is illustrated by the accompanying drawings, wherein:

Figure 1 is side elevation of the implement showing the propelling handle partly broken away.

Figure 2 is a sectional view taken on the line 2—2 of Figure 1.

Figure 3 is a sectional view taken on the line 3—3 of Figure 2.

Figure 4 is a side view of the complete implement.

In the drawings the numeral 1 designates a circular frame having the marginal, inwardly turned annular flange 2 extending entirely around the frame. The frame has a central spindle 3 extending laterally therefrom and whose free end is reduced forming an annular shoulder 4 therearound.

The numeral 5 designates a circular end plate having the inwardly extended annular flange 6 extending around the margin thereof. This flange is formed with an internal master gear 7 thereon. The end plate 5 is also formed with an inwardly extended hub 8 which fits over the reduced end of the spindle 3 and whose free end abuts the shoulder 4.

The flanges 2 and 6 are aligned and their free margins are in adjacent relation so as to form an enclosure for the gearing.

A bolt 9 is fitted axially through the spindle 3 and has a retaining head 10, on one end, and a retaining nut 11, on the other end.

There are the spaced handle brackets 12 and 13 between whose outer ends the inner end of the propelling handle 14 is secured. The bracket 13 fits closely against the frame 1 and the bracket 12 fits against the end plate 5 and the bolt 9 extends through the corresponding ends of these brackets which are secured in place one by the head 10 and the other by the nut 11.

The outer side of the frame 1 has the semicircular recess 15, at the bottom of the implement, in which the rotatable cutting disc 16 is located. This disc has a shaft 17 fixed thereto which extends inwardly through the roller bearings 18 which are mounted in the frame and on the inner end of the shaft 17 there is a spur gear 19 which is in mesh with and driven by the master gear 7.

The inner end of the spur gear 19 has the one way clutch member 20 engageable with the sliding dog 21 which slides through a diametrical bearing 22 in the shaft 17 so that as the implement is driven forwardly the clutch member 20 will engage the dog 21 to rotate the shaft 22 and the disc 16 thereon but when the implement is moved rearwardly the gearing will run idly without rotating said disc. This clutch arrangement is of conventional construction.

Surrounding the flange 6 there is the annular rim 23 which is connected to the flange 6 by means of the spaced spokes 24 and the margin of the rim 23 adjacent the disc 16 is formed with an annular, outwardly extended, guide flange 25 which guides the implement along the curb or walkway.

As more clearly shown in Figure 2 the disc 16 is formed with a sharp cutting edge which extends an appreciable distance beyond the outer margin of the guide flange 25.

The frame 1 is provided with an arcuate slot 26 which is concentric with the axis of the bolt 9. A clamp bolt 27 is fitted outwardly through the slot 26 and passes also through a registering opening in the adjacent bracket 13. The inner end of the bolt 27 has an enlarged head 28 which clamps against the inner side of the frame 1 and the outer end of the bolt 27 is externally threaded and a clamp nut 29 is screwed thereon and clamps against the bracket 13 so as to hold the frame 1 in a fixed relation with the handle but to permit an adjustment of said frame relative to the handle. This adjustment is desirable depending on the contour of the lawn adjacent the curb, walkway or other supporting surface of the ground wheel.

If it be desired to elevate, or lower, the disc cutter 16 relative to the ground wheel but without changing the operating angle of the handle 14 the nut 25 may be loosened and the frame 1 adjusted about its axis and this will have the effect of varying the elevation of the cutting disc relative to the supporting surface of the ground wheel.

The ground wheel as herein used comprises the outer end plate 5 and the rim 23 therearound and secured thereto by the spokes 24 and which rotates on bolt 9 as an axle.

The outer end of the handle 14 is equipped with the usual hand grips as 30.

The drawings and description are illustrative merely while the broad principle of the invention will be defined by the appended claim.

What I claim is:

A lawn edger comprising, a circular frame having a marginal inwardly turned flange extending entirely around the frame, said frame having a central, laterally extended spindle, a circular end plate having an annular, inwardly extended marginal flange formed with an internal master gear and having an inwardly extended hub which fits over said spindle, the flanges of the frame and end plate being aligned with their free margins in adjacent relation to form an enclosure, a bolt fitted axially through said spindle, a handle, brackets secured to the sides of the handle at one end and whose other ends have bearings through which the bolt extends, means for securing said bolt in the spindle and also securing the brackets on the bolt, a semi-circular recess located eccentrically in the outer side of the frame, a rotatable cutting disc in said recess, a shaft on which the disc is fixed, a bearing in the frame through which said shaft extends, a spur gear on the inner end of the shaft and in mesh with said master gear, a one way clutch whereby the spur gear may be connected with and disconnected from said shaft, an annular rim surrounding said flanges and connected to said plate, a guide flange on the rim adjacent said disc, said frame having an arcuate slot which is concentric with the frame and a clamp bolt fitted through said slot and through the adjacent handle bracket for clamping said adjacent bracket in a selected fixed position relative to the frame.

HILTON W. HEARN.

REFERENCES CITED

The following references are of record in the file of this patent:

UNITED STATES PATENTS

| Number | Name | Date |
| --- | --- | --- |
| 456,928 | Adams | Aug. 4, 1891 |
| 1,964,366 | Schwarz | June 26, 1934 |